(12) United States Patent
Chen

(10) Patent No.: US 11,837,736 B2
(45) Date of Patent: Dec. 5, 2023

(54) SECONDARY BATTERY, BATTERY MODULE, BATTERY PACK, DEVICE, AND MANUFACTURING METHOD

(71) Applicant: Contemporary Amperex Technology Co., Limited, Ningde (CN)

(72) Inventor: Lei Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/056,049

(22) PCT Filed: Jul. 30, 2020

(86) PCT No.: PCT/CN2020/105867
§ 371 (c)(1),
(2) Date: Nov. 17, 2020

(87) PCT Pub. No.: WO2021/073200
PCT Pub. Date: Apr. 22, 2021

(65) Prior Publication Data
US 2022/0352579 A1    Nov. 3, 2022

(30) Foreign Application Priority Data
Oct. 15, 2019  (CN) .......................... 201910976467.2

(51) Int. Cl.
*H01M 50/15*    (2021.01)
*H01M 50/186*   (2021.01)
(Continued)

(52) U.S. Cl.
CPC ....... *H01M 50/154* (2021.01); *H01M 10/049* (2013.01); *H01M 10/0431* (2013.01);
(Continued)

(58) Field of Classification Search
CPC ............. H01M 50/184; H01M 50/146; H01M 50/186; H01M 50/154
See application file for complete search history.

(56) References Cited

U.S. PATENT DOCUMENTS

| | | | |
|---|---|---|---|
| 2003/0059677 A1* | 3/2003 | Shinohara | H01M 50/174 29/623.2 |
| 2013/0056525 A1 | 3/2013 | Ostersehlte | |

(Continued)

FOREIGN PATENT DOCUMENTS

| | | |
|---|---|---|
| CN | 103401015 A | 11/2013 |
| CN | 106560939 A | 4/2017 |

(Continued)

OTHER PUBLICATIONS

Machine Translation of: CN 209087917 U, Li et al., Jul. 9, 2019.*
(Continued)

*Primary Examiner* — Kenneth J Douyette
(74) *Attorney, Agent, or Firm* — East IP P.C.

(57) ABSTRACT

The embodiments of the present disclosure provide a secondary battery, a battery module, a battery pack, a device, and a manufacturing method. The secondary battery includes: an electrode unit, including a main body portion and a first tab and a second tab extending out from the main body portion; a casing, including an accommodating cavity for accommodating the main body portion and a first opening which is in communication with the accommodating cavity; a first cover plate capping the first opening, the first cover plate including a first relief hole penetrating therethrough, the first tab passes through the first relief hole and is connected to a side of the first cover plate facing away from the accommodating cavity; and a sealing plate, which (Continued)

is sealingly connected to the side of the first cover plate facing away from the accommodating cavity and covers the first relief hole.

12 Claims, 10 Drawing Sheets

(51) Int. Cl.
  *H01M 50/169* (2021.01)
  *H01M 10/04* (2006.01)
  *H01M 50/148* (2021.01)

(52) U.S. Cl.
  CPC ....... *H01M 50/169* (2021.01); *H01M 50/186* (2021.01); *H01M 2220/20* (2013.01)

(56) References Cited

U.S. PATENT DOCUMENTS

| | | | |
|---|---|---|---|
| 2016/0149172 | A1 | 5/2016 | Seong et al. |
| 2017/0062791 | A1* | 3/2017 | Yoo .................. H01M 50/176 |

FOREIGN PATENT DOCUMENTS

| | | | |
|---|---|---|---|
| CN | 206742419 | U | 12/2017 |
| CN | 207503881 | U | 6/2018 |
| CN | 108428921 | A | 8/2018 |
| CN | 207800665 | U | 8/2018 |
| CN | 209087917 | U | 7/2019 |
| CN | 110729421 | A | 1/2020 |
| CN | 210743996 | U | 6/2020 |
| JP | 2003022796 | A | 1/2003 |
| JP | 2003142042 | A | 5/2003 |
| JP | 2005044626 | A | 2/2005 |
| JP | 2014203514 | A | 10/2014 |
| KR | 20190097389 | A | 8/2019 |

OTHER PUBLICATIONS

Machine Translation of: CN 206742419 U, Chen et al., Dec. 12, 2017.*
PCT International Search Report and Written Opinion for corresponding International Application No. PCT/CN2020/105867 dated Nov. 4, 2020, 11 pages.
The extended European search report for EP Application No. 20827973.7, dated Sep. 1, 2021, 20 pages.
The First Examination Report for EP Application No. 20827973.7, dated May 9, 2022, 4 pages.
The First Office Action for Chinese Application No. 201910976467.2, dated Mar. 25, 2023, 11 pages.
The Official Action and search report dated May 30, 2023 for Japanese application No. 2022-520899, 5 pages.
The Second Official Action dated Oct. 17, 2023 for Japanese application No. 2022-520899, 7 pages.

* cited by examiner

SECONDARY BATTERY, BATTERY MODULE, BATTERY PACK, DEVICE, AND MANUFACTURING METHOD

CROSS-REFERENCE TO RELATED DISCLOSURE

This application is a National Stage of International Application No. PCT/CN2020/105867, filed on Jul. 30, 2020, which claims priority to Chinese Patent Application No. 201910976467.2, filed on Oct. 15, 2019, both of which are hereby incorporated by reference in their entireties.

TECHNICAL FIELD

The present disclosure relates to the technical field of energy storage apparatus, and in particular to a secondary battery, a battery module, a battery pack, a device and a manufacturing method.

BACKGROUND

In the secondary battery, in order to increase the energy density of the secondary battery, as much active material as possible is usually accommodated within the casing to improve the space utilization rate inside the casing. The secondary battery usually includes a casing, a cover plate, an electrode unit and an electrode terminal, the casing is sealingly connected with the cover plate, the electrode unit is disposed within the casing and includes a main body portion and tabs extending out from the main body portion, and the tabs are electrically connected with the electrode terminal by other mechanical components (such as adaptor plates). When the internal space of the casing remains unchanged, the larger the volume of the main body portion, the more the active material. However, the tabs or other mechanical components (such as adaptor plates) disposed within the casing will occupy the internal space of the casing, as a result, more active material cannot be contained within the casing, reducing the energy density of the secondary battery.

SUMMARY

The present disclosure provides a secondary battery, a battery module, a battery pack, a device, and a manufacturing method, which are aimed to improve the energy density of the secondary battery.

An embodiment of a first aspect of the present disclosure provides a secondary battery, including: an electrode unit, including a main body portion and a first tab and a second tab extending out from the main body portion; a casing, including an accommodating cavity for accommodating the main body portion and a first opening which is in communication with the accommodating cavity; a first cover plate capping the first opening, the first cover plate including a first relief hole penetrating therethrough, the first tab passing through the first relief hole and being connected to a side of the first cover plate facing away from the accommodating cavity; and a sealing plate, which is sealingly connected to the side of the first cover plate facing away from the accommodating cavity and covers the first relief hole.

According to an embodiment of the first aspect of the present disclosure, an outer surface of the first cover plate facing away from the accommodating cavity is recessed toward the accommodating cavity and forms a first recess, the first recess includes a bottom plate, and the first relief hole is located on a side of the bottom plate along a thickness direction of the secondary battery; and the first tab including a connecting portion and a fixing portion, the fixing portion is disposed within the first recess and connected to the bottom plate, and the connecting portion is disposed to be bent relative to the fixing portion and penetrates through the first relief hole.

Optionally, the number of the first relief hole is two, and two first relief holes are located on two sides of the bottom plate along the thickness direction; and the number of the electrode units is two, two electrode units are arranged side by side along the thickness direction, and the first tabs of the two electrode units respectively pass through the two first relief holes, and the fixing portions of the two first tabs extend in directions approaching each other.

Optionally, the first cover plate includes an inner surface facing the accommodating cavity, and the bottom plate is disposed to protrude out from the inner surface in a direction facing the accommodating cavity.

Optionally, the first recess includes a first segment and a second segment which are successively arranged in a height direction of the secondary battery, and the first segment is located on a side of the second segment facing away from the accommodating cavity, and an orthographic projection of the second segment in the height direction is located within an orthographic projection of the first segment in the height direction; and at least part of the fixing portion is accommodated in the second segment, and the sealing plate is accommodated in the first segment.

Optionally, the first recess includes a first side wall facing the first segment, a second side wall facing the second segment, and a transition portion, the first side wall and the second side wall are connected with each other by the transition portion, and the sealing plate is located on a side of the transition portion facing away from the accommodating cavity.

Optionally, the sealing plate includes a welding region at an edge, a reinforcing rib is provided at the inner surface of the first cover plate facing the accommodating cavity, and an orthographic projection of the reinforcing rib in the height direction of the electrode unit covers an orthographic projection of the welding region in the height direction.

According to an embodiment of the first aspect of the present disclosure, the secondary battery further includes a separating plate located between the first cover plate and the main body portion, the separating plate is provided with a second relief hole penetrating therethrough, and the first tab passes through the first relief hole and the second relief hole.

Optionally, an orthographic projection of the second relief hole at least partially overlap that of the first relief hole, in the height direction of the electrode unit.

Optionally, the separating plate includes a first surface facing the first cover plate and a second surface facing the main body portion, the first surface is recessed toward the second surface and forms a second recess, and at least part of the bottom plate is disposed within the second recess.

Optionally, the secondary battery further includes a first electrode terminal electrically connected with the first tab and a second electrode terminal electrically connected with the second tab, the first electrode terminal is electrically connected with the first cover plate and the casing, and the second electrode terminal is insulated from the first cover plate and the casing.

Optionally, the secondary battery further includes a second cover plate, the casing includes a second opening which is in communication with the accommodating cavity, and the second opening and the first opening are respectively located at two ends of the casing along the height direction of the secondary battery, the second cover plate caps the second opening, the first electrode terminal and the second electrode terminal are both disposed on the second cover plate, and the first tab is electrically connected with the first electrode terminal by the first cover plate, the casing, and the second cover plate in sequence, and the second tab is insulated from the second cover plate.

An embodiment of a second aspect of the present disclosure further provides a battery module, including a frame and a plurality of the above-mentioned secondary batteries, the plurality of secondary batteries being arranged side by side within the frame.

An embodiment of a third aspect of the present disclosure also provides a battery pack, including a housing and a plurality of the above-mentioned secondary batteries, the plurality of secondary batteries being arranged within the housing.

An embodiment of a fourth aspect of the present disclosure also provides a device using a secondary battery as a power source, including an accommodating portion and a plurality of the above-mentioned secondary batteries disposed within the accommodating portion.

An embodiment of a fifth aspect of the present disclosure also provides a manufacturing method for a secondary battery, including: a step of assembling an electrode unit: placing an electrode unit within an accommodating cavity of a casing, the electrode unit including a main body portion and a first tab and a second tab extending out from the main body portion, the casing including a first opening which is in communication such that the first tab faces the first opening; a step of capping with a first cover plate: capping the first opening with the first cover plate, the first cover plate including a first relief hole penetrating therethrough, and passing the first tab through the first relief hole and connecting the first tab to a side of the first cover plate facing away from the accommodating cavity; and a step of sealing: sealingly connecting a sealing plate to the side of the first cover plate facing away from the accommodating cavity, and covering the first relief hole with the sealing plate.

According to an embodiment of the fifth aspect of the present disclosure, before the step of covering the first cover plate, the manufacturing method further includes: punching the first cover plate to form a first recess on a surface of the first cover plate, the first recess including a bottom plate, and positioning the first relief hole on a side of the bottom plate along the thickness direction of the secondary battery; and the step of capping with the first cover plate further includes: capping the first opening with the first cover plate, positioning the first recess on the side of the first cover plate facing away from the accommodating cavity, passing the first tab through the first relief hole, the first tab including a connecting portion and a fixing portion, passing the connecting portion through the first relief hole, and bending the fixing portion relative to the connecting portion, such that the fixing portion is disposed in the first recess and connected to the bottom plate.

Optionally, before the step of capping with the first cover plate, the manufacturing method further includes: capping the first opening with a separating plate, the separating plate being provided with a second relief hole penetrating therethrough, and passing the first tab through the second relief hole; and the step of capping with the first cover plate further includes: subsequently capping the separating plate with the first cover plate, and passing the first tab through the second relief hole and the first relief hole in sequence.

In the secondary battery of the present disclosure, the secondary battery includes the electrode unit, the case, the first cover plate, and the sealing plate. The electrode unit is disposed within the casing, and the first tab of the electrode unit protrudes out from the first opening. The first cover plate caps the first opening, such that the first tab passes through the first relief hole and is connected to the side of the first cover plate facing away from the accommodating cavity. By passing the first tab through the first relief hole and connecting to the side of the first cover plate facing away from the accommodating cavity, the space occupied by the tab in the casing can be reduced, thereby the energy density of the secondary battery can be increased.

DESCRIPTION OF THE DRAWINGS

Other features, objects and advantages of the present disclosure will become more apparent by reading the following detailed description of the non-restrictive embodiments with reference to the accompanying drawings, in which, the same or similar reference numerals indicate the same or similar features.

DESCRIPTION OF REFERENCE NUMERALS

Figure 1:
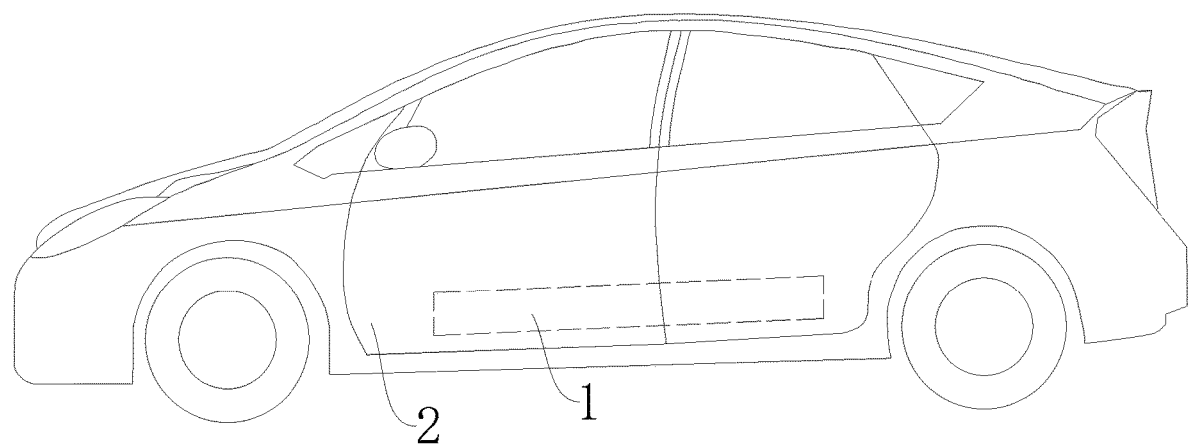
FIG. 1 is a schematic structural view of a vehicle according to an embodiment of the present disclosure.

1: battery pack; 2: vehicle body;
11: battery module; 12: housing;
10: secondary battery; 20: frame; 21: end plate; 22: band; 23: side plate;
100: electrode unit; 110: main body portion; 120: first tab; 121: connecting portion; 122: fixing portion; 130: second tab;
200: casing; 210: accommodating cavity; 220: first opening; 230: second opening;
300: first cover plate; 310: first relief hole; 320: first recess; 321: bottom plate; 322: first segment; 323:

second segment; 324: first side wall; 325: second side wall; 326: transition portion; 330: inner surface; 340: reinforcing rib;
400: sealing plate;
500: separating plate; 510: second relief hole; 520: first surface; 530: second surface; 540: second recess;
600: first electrode terminal;
700: second electrode terminal;
800: second cover plate.

DETAILED DESCRIPTION

Features and exemplary embodiments of various aspects of the present disclosure are described in detail below. In the following detailed description, numerous specific details are set forth, to provide comprehensive understanding of the present disclosure. However, for those skilled in the art, it will be apparent to that the present disclosure may be practiced without some of the specific details. The following description of the embodiments is merely to provide a better understanding of the present disclosure by illustrating examples of the present disclosure. In the drawings and the following description, at least some of the known structures and techniques are not shown, to avoid unnecessarily obscuring the present disclosure; for clarity, the size of some of the structures may be enlarged. In addition, features, structures, or characteristics described hereinafter may be combined in any suitable manner in one or more embodiments.

In the description of the present disclosure, it should be stated, unless otherwise specified, "a plurality of" refers to two or more; and the directions or positional relationships indicated by the terms such as "upper", "lower", "left", "right", "inner", "outside" and the like, are only for the convenience of describing the present disclosure and simplifying the description, and do not mean or imply that the involved device or element must have a specific orientation or must be configured or operated in the specific orientation, therefore, they cannot be understood as limiting the present disclosure. In addition, the terms "first", "second" and the like are only used for descriptive purposes, and should not be interpreted as indicating or implying relative importance.

The orientation terms appearing in the following description refer to the directions shown in the drawings, and are not intended to limit the specific structure of the present disclosure. In the description of the present disclosure, it should also be stated, unless otherwise specified and limited, the terms "installed", "connected to", "connected with" or the like should be understood in a broad sense. For example, a connection may refer to fixed connection or disassembly connection; or may refer to integral connection; or may refer to direct connection or indirect connection. For the ordinary person skilled in the art, the specific meanings of the above terms in the present disclosure may be understood according to specific situations.

In order to better understand the present disclosure, a secondary battery, a battery module, a battery pack, a device, and a manufacturing method according to the embodiments of the present disclosure will be described in detail below with reference to FIGS. 1 to 13.

As shown in FIG. 1, an embodiment of the present disclosure first provides a vehicle, including a vehicle body 2, an accommodating portion and a battery pack 1 disposed on the vehicle body 2, and the battery pack 1 is disposed on the accommodating portion.

The vehicle is a new energy vehicle, which may be a pure electric vehicle, a hybrid vehicle or an extended-range vehicle. The vehicle body 2 is provided with a drive motor, which is electrically connected to the battery pack 1; the battery pack 1 provides electrical energy, and the drive motor is connected to the wheels on the vehicle body 2 by a transmission mechanism, thereby driving the vehicle to travel. Optionally, the battery pack 1 may be horizontally arranged at a bottom of the vehicle body 2.

Figure 2:
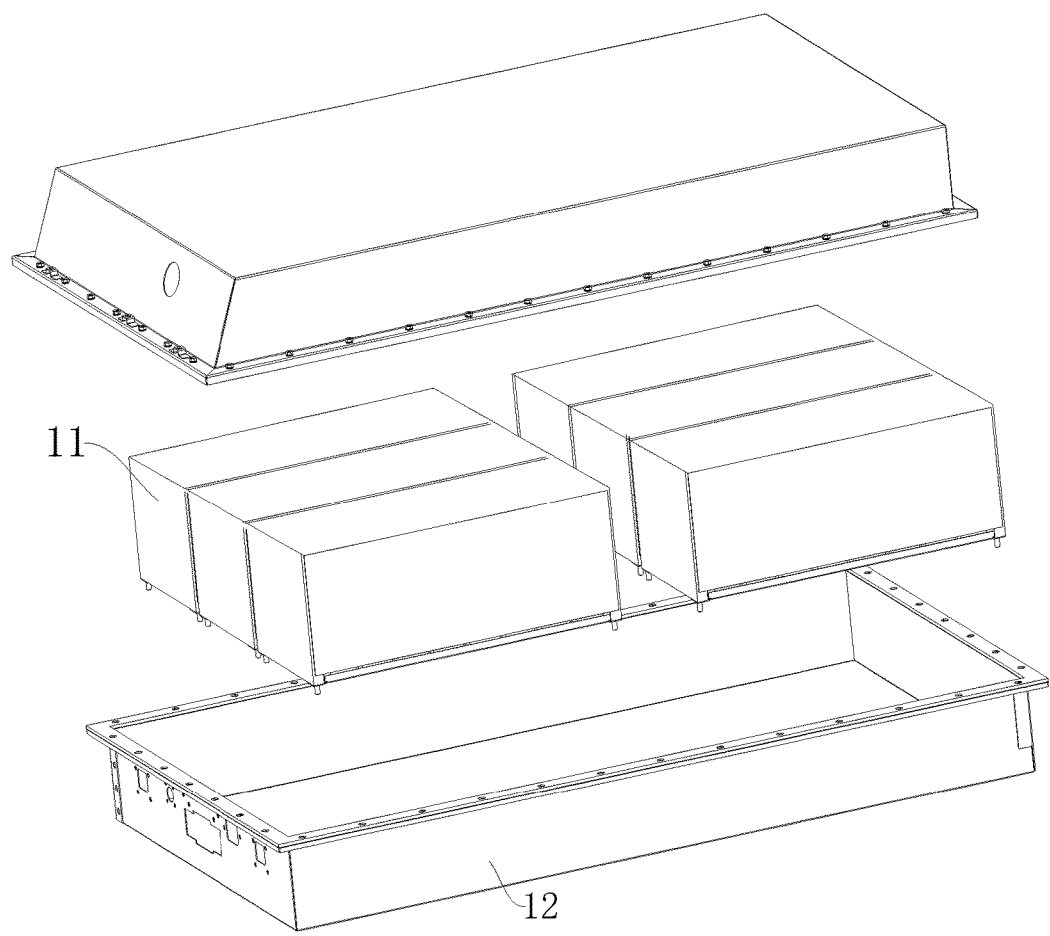
FIG. 2 is a schematic structural view of a battery pack according to an embodiment of the present disclosure.

Please also refer to FIG. 2, the battery pack 1 may be disposed in a variety of manners. In some optional embodiments, the battery pack 1 includes a housing 12 and a battery module 11 disposed within the housing 12.

The number of the battery module 11 is one or plural, and a plurality of battery modules 11 are arranged within the housing 12. The type of the housing 12 is not limited. The housing 12 may be a housing in shape of frame, a housing in shape of disc, a housing in shape of box, or the like. Specifically, the housing 12 may include a lower housing for accommodating the battery module(s) and an upper housing capping the lower housing.

Figure 3:
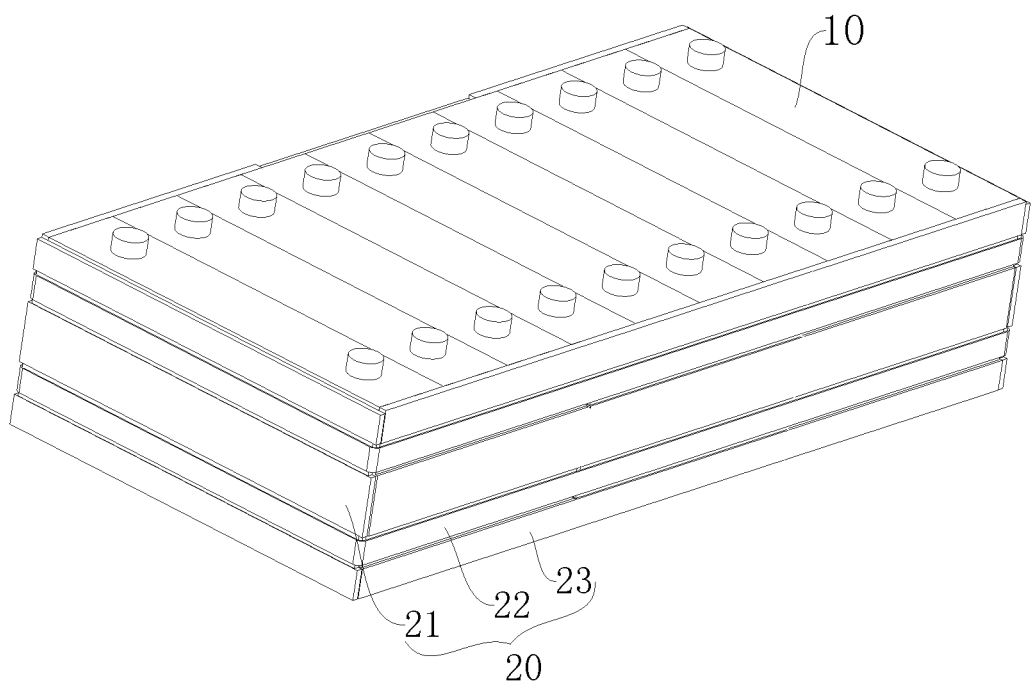
FIG. 3 is a schematic structural view of a battery module according to an embodiment of the present disclosure.

Please also refer to FIG. 3, the battery module 11 may be disposed in a variety of manners. In some optional embodiments, the battery module 11 includes a frame 20 and a plurality of secondary batteries 10 disposed within the frame 20. The plurality of secondary batteries 10 are arranged side by side within the frame 20.

The frame 20 may be disposed in a variety of manners. For example, the frame 20 includes an outer casing and a cover plate which caps the outer case; alternatively, the frame 20 includes side plates 23 and end plates 21 that are connected with each other to form an enclosed space; alternatively, the frame 20 includes two opposite end plates 21 and a band 22 surrounding the end plates 21 and the secondary batteries 10; alternatively, as shown in FIG. 3, the frame 20 includes side plates 23, end plates 21 and the band 22.

The battery pack 1 is not limited to be disposed in the above-mentioned manner. In some optional embodiments, the plurality of secondary batteries 10 may also be directly disposed within the housing 12 of the battery pack 1. The manner of disposing the plurality of secondary batteries 10 within the housing 12 is not limited. For example, the plurality of secondary batteries 10 are stacked within the housing 12 in its height direction; alternatively, the plurality of secondary batteries 10 are arranged side by side within the housing 12; alternatively, some of the secondary batteries 10 are stacked within the housing 12, and the other secondary batteries 10 are arranged side by side within the housing 12; etc.

It can be understood that the secondary battery 10 may be used not only in vehicles but also in other devices. An embodiment of the present disclosure also provides a device that uses the secondary battery 10 as a power source. The device may be, but is not limited to, a vehicle, a ship, an aircraft, or the like.

Figure 4:
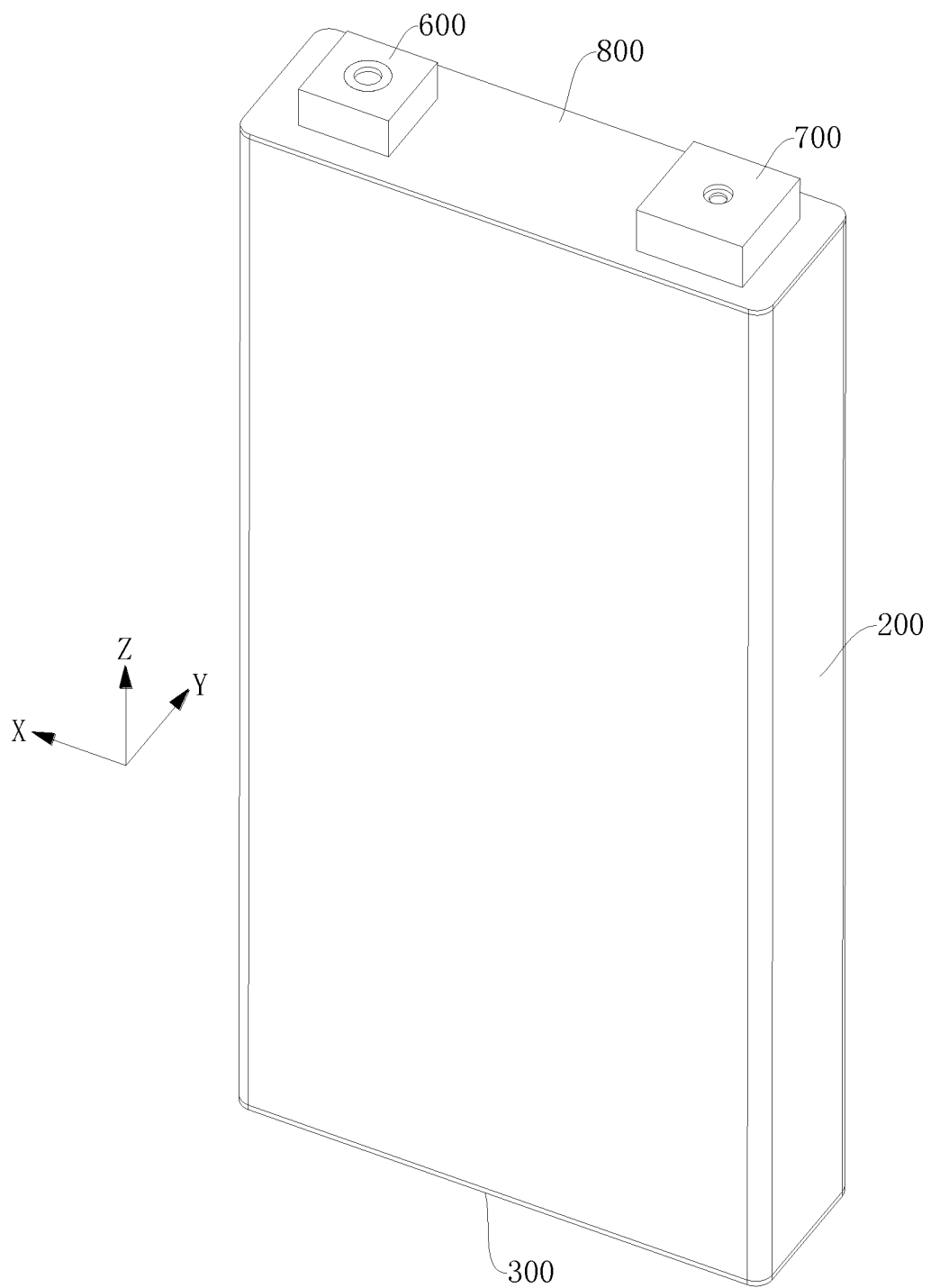
FIG. 4 is a schematic structural view of a secondary battery according to an embodiment of the present disclosure.
Figure 5:
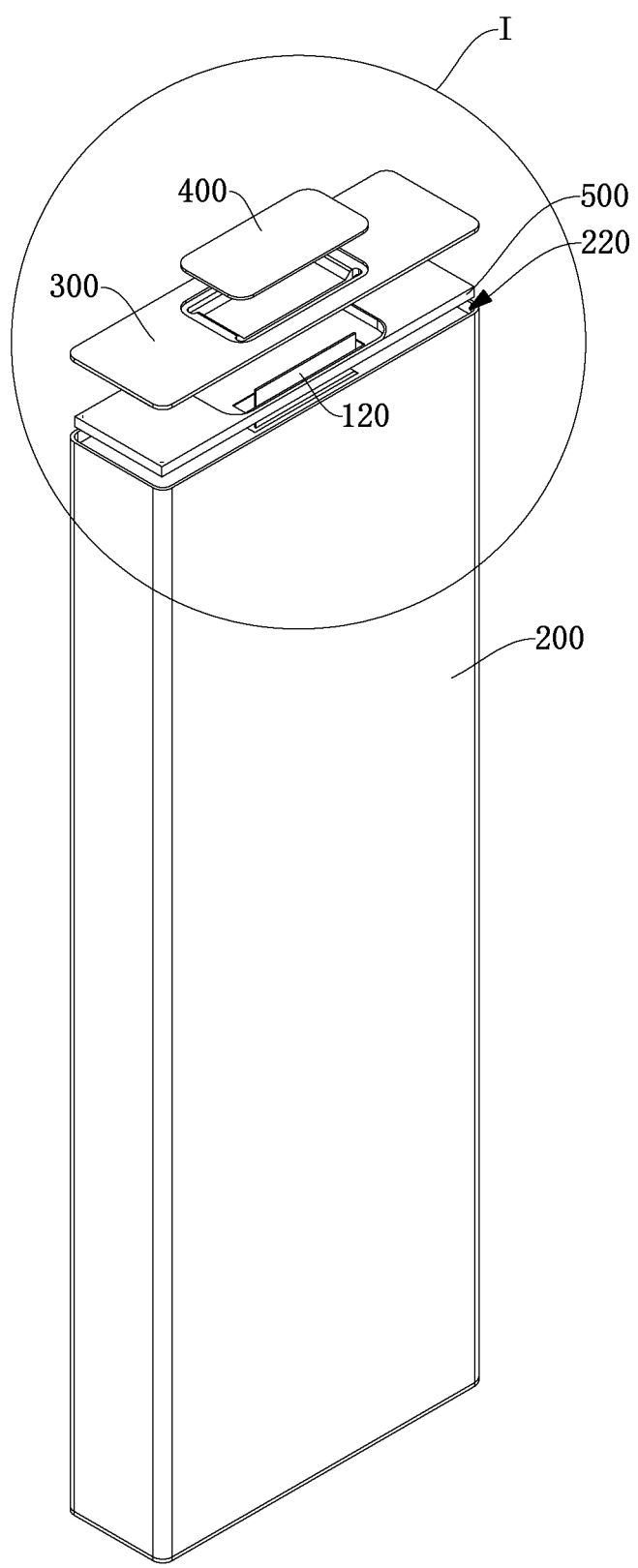
FIG. 5 is a schematic view of an exploded structure of a secondary battery according to an embodiment of the present disclosure.
Figure 6:
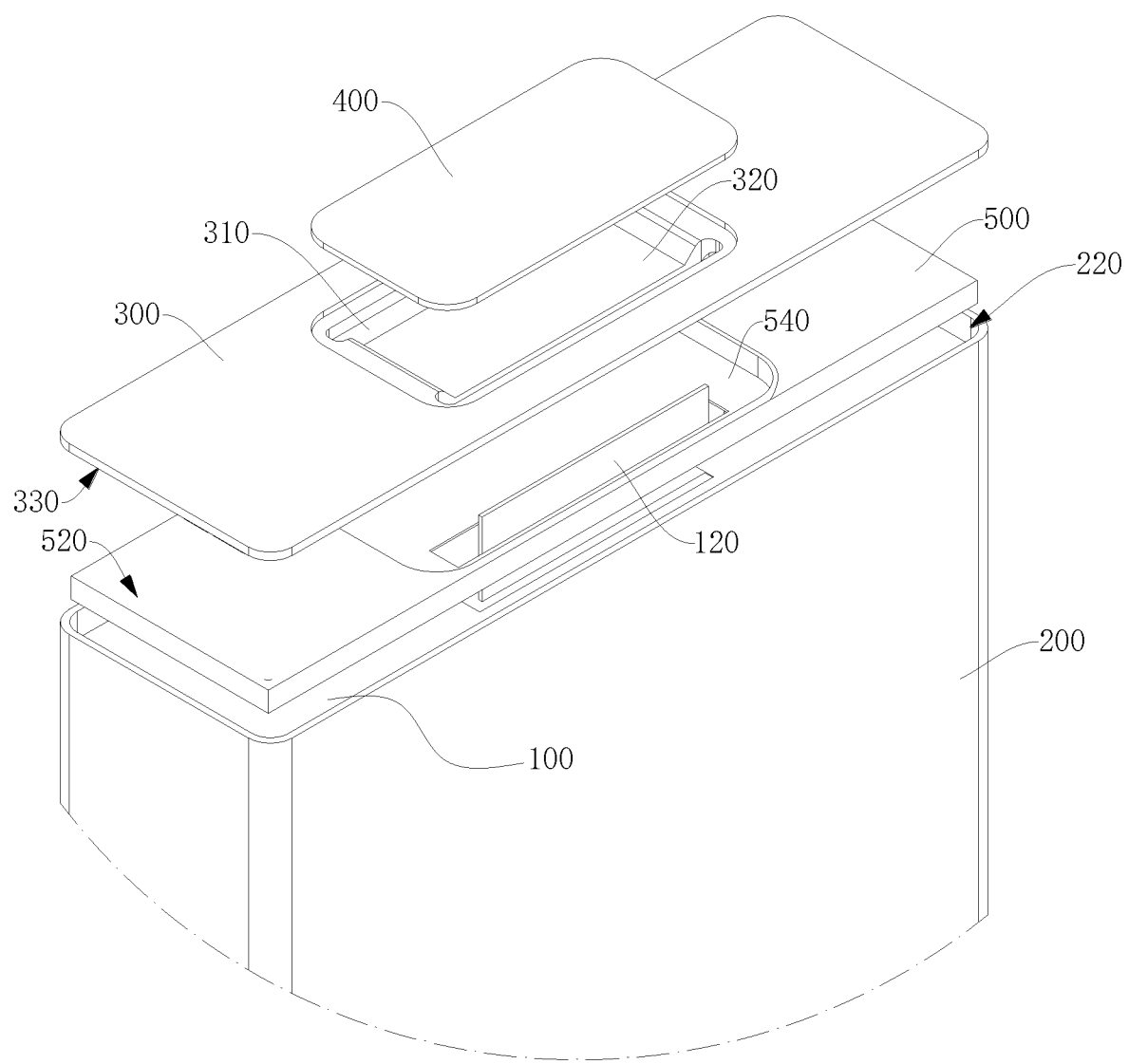
FIG. 6 is a schematic enlarged view of a partial structure at portion I in FIG. 5.
Figure 7:
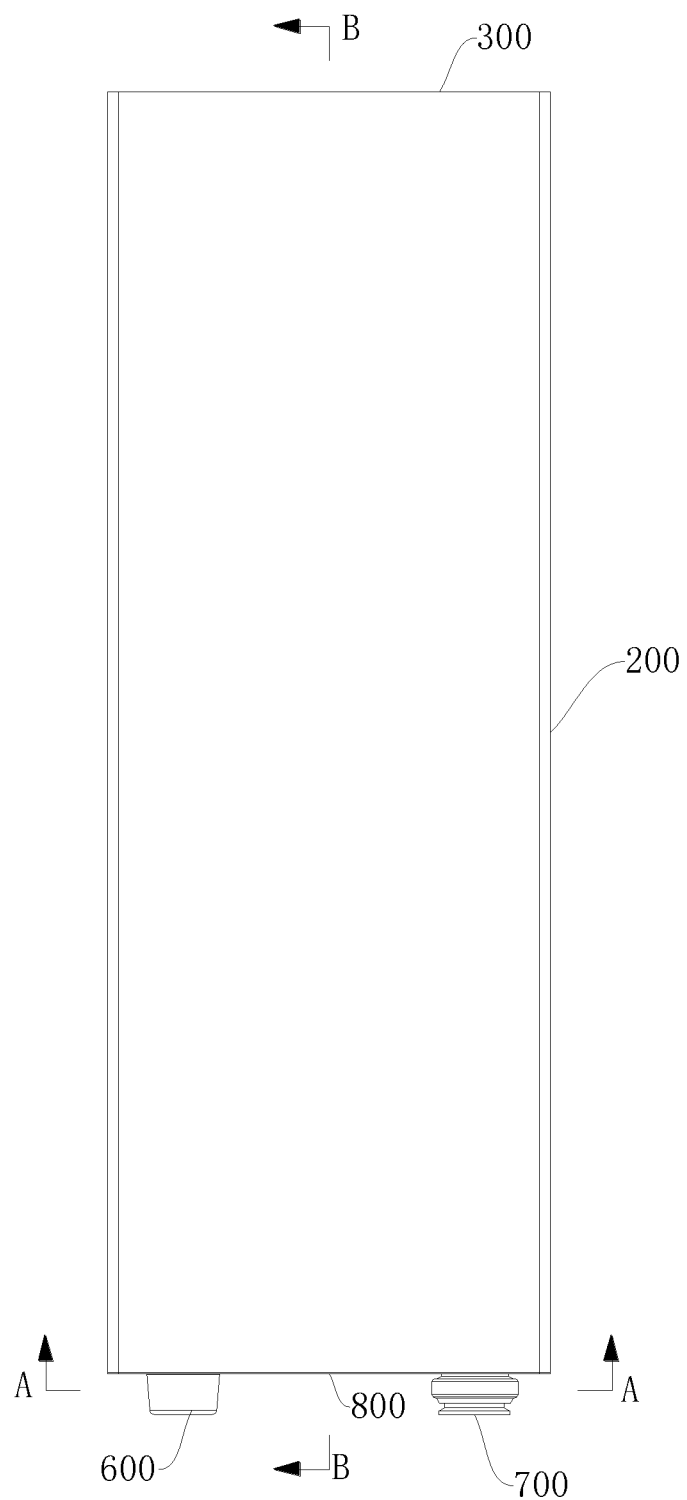
FIG. 7 is a front view of a secondary battery according to an embodiment of the present disclosure.
Figure 8:
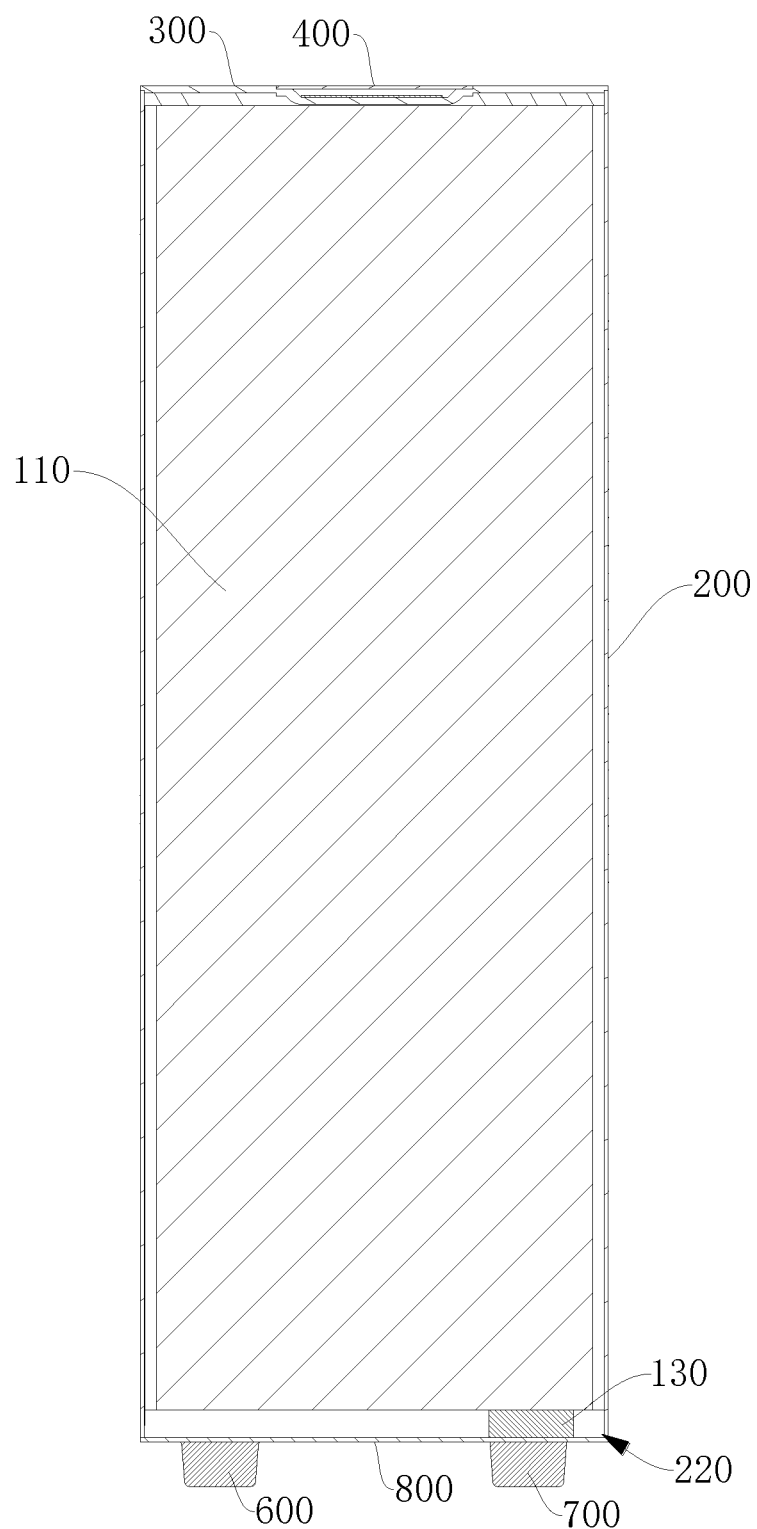
FIG. 8 is a cross-segmental view taken along A-A in FIG. 7.
Figure 9:
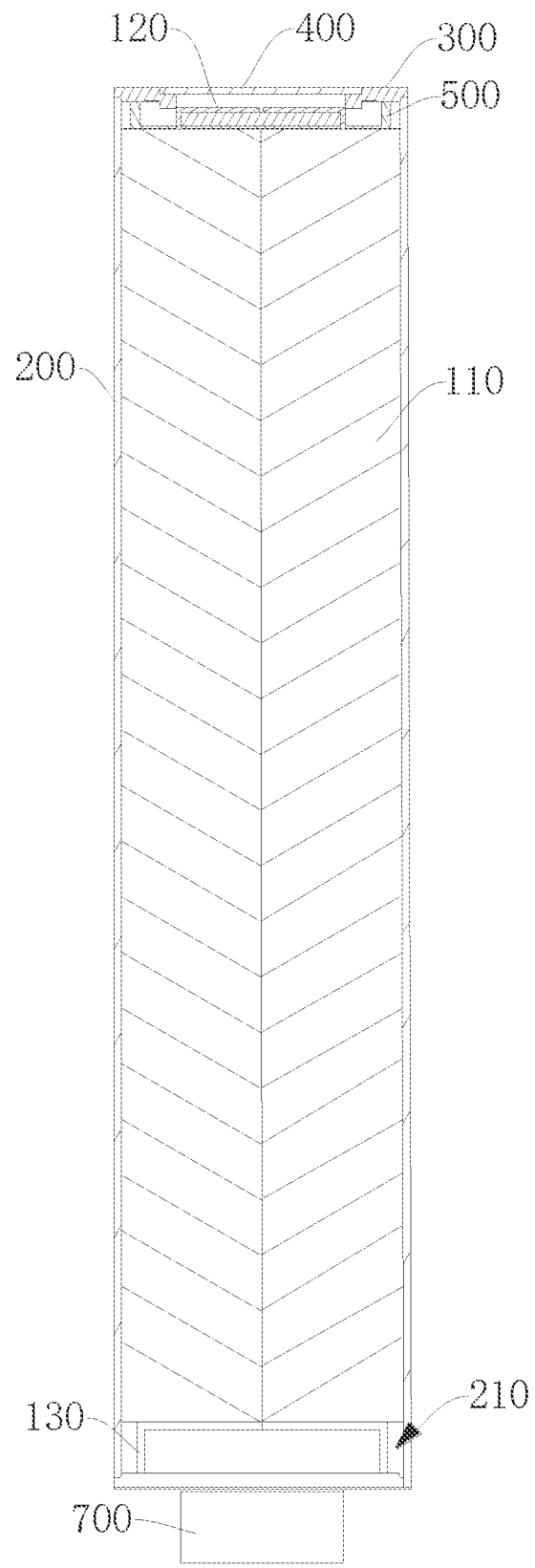
FIG. 9 is a cross-segmental view taken along B-B in FIG. 7.
Figure 10:
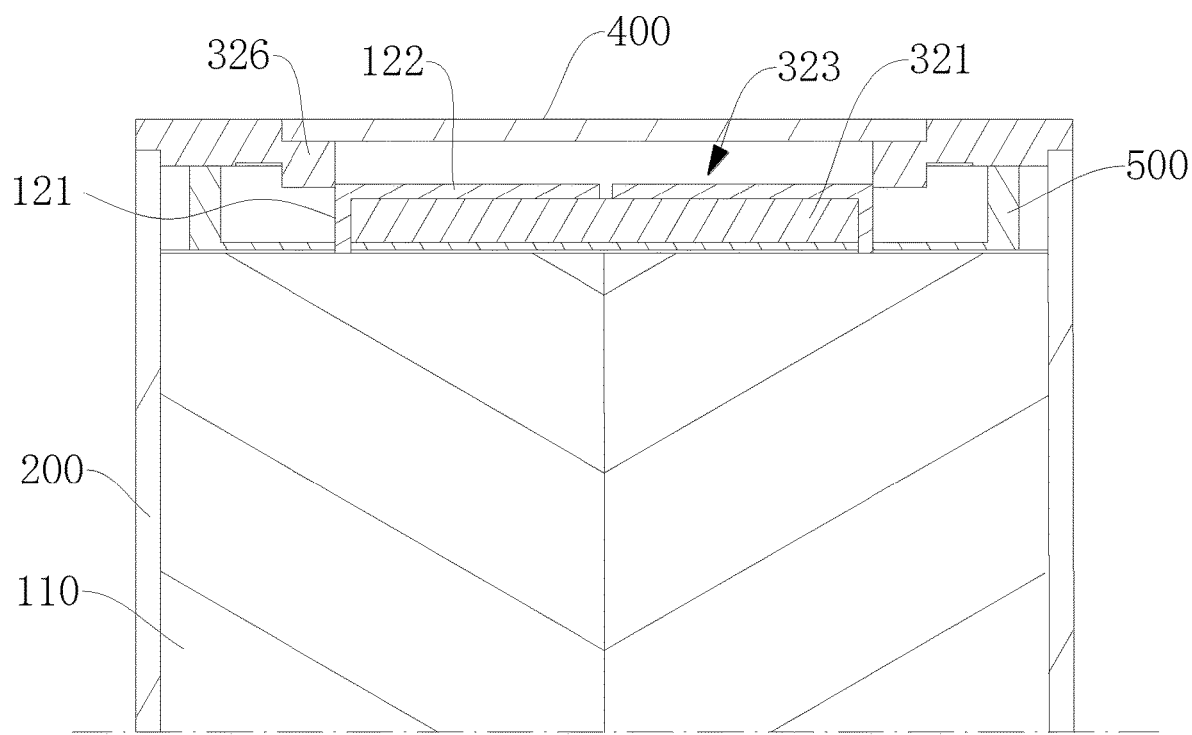
FIG. 10 is a schematic enlarged view of a partial structure of FIG. 9.
Figure 11:
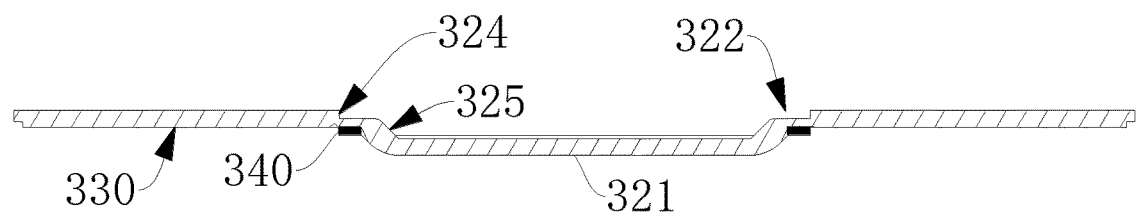
FIG. 11 is a schematic structural view of a first cover plate of a secondary battery according to an embodiment of the present disclosure.

Please also refer to FIGS. 4 to 9. FIG. 4 is a schematic structural view of the secondary battery 10 according to the embodiment of the present disclosure, FIG. 5 is a schematic view of an exploded structure of the secondary battery 10 according to the embodiment of the present disclosure, FIG. 6 is a schematic enlarged view of a partial structure of FIG. 5, FIG. 7 is a front view of the secondary battery 10 according to the embodiment of the present disclosure, FIG. 8 is a cross-segmental view taken along A-A in FIG. 7, and FIG. 9 is a cross-segmental view taken along B-B in FIG. 7.

The secondary battery 10 according to the embodiment of the present disclosure includes: an electrode unit 100, including a main body portion 110, and a first tab 120 and a second tab 130 extending out from the main body portion 110; a casing 200, including an accommodating cavity 210 for accommodating the main body portion 110 and a first opening 220 which is in communication with the accommodating cavity 210; a first cover plate 300 capping the first opening 220, the first cover plate 300 including a first relief hole 310 penetrating therethrough, the first tab 120 passing through the first relief hole 310 and being connected to a side of the first cover plate 300 facing away from the accommodating cavity 210; and a sealing plate 400, which is sealingly connected to the side of the first cover plate 300 facing away from the accommodating cavity 210 and covers the first relief hole 310.

In the secondary battery 10 according to the embodiment of the present disclosure, the secondary battery 10 includes the electrode unit 100, the casing 200, the first cover plate 300 and the sealing plate 400. The electrode unit 100 is disposed within the casing 200, and the first tab 120 of the electrode unit 100 protrudes out from the first opening 220. The first cover plate 300 caps the first opening 220, such that the first tab 120 passes through the first relief hole 310 and is connected to the side of the first cover plate 300 facing away from the accommodating cavity 210. Therefore, during the assembling process of the secondary battery 10 according to the embodiment of the present disclosure, after the first tab 120 is passed through the first relief hole 310, the first tab 120 may be first bent such that at least part of the first tab 120 come into contact with the first cover plate 300, and then the first tab 120 may be directly welded to the first cover plate 300, other mechanical components (such as adaptor plates) can be omitted, thereby the production cost can be reduced. Furthermore, when the first tab 120 is welded to the side of the first cover plate 300 facing away from the accommodating cavity 210, the space occupied by the first tab 120 in the casing 200 can be reduced, thereby the energy density can be increased. Moreover, after the first tab 120 is welded with the first cover plate 300, there is no need to change the relative positional relationship between the first tab 120 and the main body portion 110, and the probability of the first tab 120 being inserted into the main body portion 110 can be reduced.

Therefore, the secondary battery 10 according to the embodiment of the present disclosure can not only reduce the space occupied by the first tab 120 in the casing 200, but also improve the safety performance of the secondary battery 10.

The secondary battery 10 further includes a first electrode terminal 600 electrically connected with the first tab 120 and a second electrode terminal 700 electrically connected with the second tab 130. The first electrode terminal 600 is electrically connected with the casing 200, and the casing 200 is electrically connected with the first cover plate 300, such that the first electrode terminal 600 is electrically connected with the first tab 120 by the casing 200 and the first cover plate 300. The second electrode terminal 700 is insulated from the casing 200, and the first cover plate 300 each other.

In some optional embodiments, the secondary battery 10 further includes a second cover plate 800 disposed opposite to the first cover plate 300. The casing 200 includes a second opening 230 which is in communication with the accommodating cavity 210, and the second opening 230 and the first opening 220 are respectively located on two sides of the casing 200 in a height direction (Z direction in FIG. 4). The positions of disposing the first electrode terminal 600 and the second electrode terminal 700 are not limited here, the first electrode terminal 600 and the second electrode terminal 700 may be disposed on the same side of the secondary battery 10. For example, the first electrode terminal 600 and the second electrode terminal 700 are both disposed on the first cover plate 300; alternatively, the first electrode terminal 600 and the second electrode terminal 700 are both disposed on the second cover plate 800. Alternatively, in other optional embodiments, the first electrode terminal 600 and the second electrode terminal 700 are respectively disposed on two sides of the secondary battery 10, and the first electrode terminal 600 and the second electrode terminal 700 are respectively disposed on the first cover plate 300 and the second cover plate 800, the first tab 120 is connected with the first electrode terminal 600 by the first cover plate 300, the casing 200, and the second cover plate 800 in sequence, and the second tab 130 is insulated from the second cover plate 800.

The first tab 120 may be disposed in a variety of manners. Please also refer to FIG. 10. In some optional embodiments, the first tab 120 includes a connecting portion 121 and a fixing portion 122, the connecting portion 121 is connected between the fixing portion 122 and the main body portion 110, and the connecting portion 121 penetrates through the first relief hole 310, the fixing portion 122 intersect with the connecting portion 121, and the fixing portion 122 is connected to an outer surface of the first cover plate 300. The outer surface of the first cover plate 300 refers to a surface of the first cover plate 300 facing away from the accommodating cavity 210.

In these optional embodiments, the connecting portion 121 is disposed to be bent relative to the fixing portion 122, and the connecting portion 121 penetrates through the first relief hole 310. Therefore, the first tab 120 can penetrate through the first relief hole 310 via the connecting portion 121, and the fixing portion 122 extends out from the first relief hole 310 and is connected to the first cover plate 300.

The first cover plate 300 may be disposed in a variety of manners. In some optional embodiments, please also refer to FIG. 11. The outer surface of the first cover plate 300 facing away from the accommodating cavity 210 is recessed toward the accommodating cavity 210 and forms a first recess 320. The first recess 320 includes a bottom plate 321, and the first relief hole 310 is located on a side of the bottom plate 321 in a thickness direction of the secondary battery 10 (Y direction in FIG. 4), the connecting portion 121 of the first tab 120 penetrates through the first relief hole 310, and the fixing portion 122 is disposed within the first recess 320 and connected to the bottom plate 321. When the electrode unit 100 has a laminated structure, the electrode unit 100 is formed by stacking a plurality of electrode plates and an separating film, and the thickness direction of the secondary battery 10 is identical to a stacking direction; when the electrode unit 100 has a wound structure, the electrode unit 100 is formed by winding electrode plates and the isolating film, the electrode unit 100 includes two flat surfaces and two narrow surfaces, the so-called flat surface is generally a plane surface, and the thickness direction of the secondary battery 10 is a direction perpendicular to the flat surface.

In these optional embodiments, the first cover plate 300 is formed with the first recess 320, and the fixing portion 122 of the first tab 120 is located within the first recess 320, the space occupied by the first tab 120 in the height direction (Z direction in FIG. 4) can be reduced, the flatness of the outer surface of the first cover plate 300 can be improved, and the space occupied by the entire secondary battery 10 in the battery module can be reduced.

The number of the electrode unit 100 in the casing 200 is not limited. There may be only one electrode unit 100 within the casing 200. Alternatively, in other optional embodiments, two electrode units 100 are disposed within the casing 200, and the two electrode units 100 are arranged side by side in the thickness direction. Two first relief holes 310 are disposed on the first cover plate 300, and the two first relief holes 310 are located on two sides of the bottom plate 321 along the thickness direction. The connecting portions 121 of the first tabs 120 of the two electrode units 100 respectively pass through the two first relief holes 310, and the fixing portions 122 of the two first tabs 120 extend in directions approaching each other.

The relative positional relationship between the fixing portions 122 of the two first tabs 120 may be disposed in a variety of manners. For example, under the premise that the two fixing portions 122 are both disposed within the first recess 320, the two fixing portions 122 may be arranged side by side in the thickness direction, or the two fixing portions 122 may be laminated in the height direction.

The first recess 320 may be disposed in a variety of manners. For example, an extension depth of the first recess 320 in the height direction is larger than an extension thickness of the first cover plate 300 in the height direction, and the bottom plate 321 is disposed to protrude out from the inner surface 330 of the first cover plate 300 facing the receiving cavity 210 in a direction facing the receiving cavity 210.

In these optional embodiments, the depth of the first recess 320 is relatively deep, the accommodating volume of the first recess 320 can be increased, and it can be ensured that both the fixing portions 122 of the two first tabs 120 can be disposed within the first recess 320.

In other optional embodiments, the first recess 320 includes a first segment 322 and a second segment 323 which are successively arranged in the height direction, and the first segment 322 is located on a side of the second segment 323 facing away from the accommodating cavity 210, and an orthographic projection of the second segment 323 in the height direction is located within an orthographic projection of the first segment 322 in the height direction; at least part of the fixing portion 122 is accommodated in the second segment 323, and the sealing plate 400 is accommodated in the first segment 322.

In these optional embodiments, the first recess 320 is formed with the second segment 323 for accommodating the fixing portion 122 and the first segment 322 for accommodating the sealing plate 400 in the height direction, respectively. The orthographic projection of the second segment 323 in the height direction is located within the orthographic projection of the first segment 322 in the height direction, that is, a size of the first segment 322 is larger than a size of the second segment 323. It can be ensured that the sealing plate 400 completely covers the second segment 323, thereby it can be ensured that the sealing plate 400 completely covers the first relief hole 310 and the fixing portion 122, and the sealing performance of the secondary battery 10 can be improved.

The sealing plate 400 may be disposed to be accommodated in the first segment 322 in a variety of manners. For example, the sealing plate 400 is connected to a surface of the first recess 320 facing the first segment 322.

Alternatively, in other optional embodiments, the first recess 320 includes a first side wall 324 facing the first segment 322 and a second side wall 325 facing the second segment 323, the first side wall 324 and the second side wall 325 are connected with each other by a transition portion 326, and the sealing plate 400 is located on a side of the transition portion 326 facing away from the accommodating cavity 210.

In these optional embodiments, the first recess 320 includes the transition portion 326 for connecting the first side wall 324 and the second side wall 325, and the transition portion 326 is used to support the sealing plate 400, such that the sealing plate 400 can be connected to the side of the transition portion 326 facing away from the accommodating cavity 210. By providing the transition portion 326, a supporting can be provided for the sealing plate 400, the stability of the relative position between the sealing plate 400 and the first cover plate 300 can be improved, and the welding of the sealing plate 400 and the first cover plate 300 can be facilitated.

The first segment 322 and the second segment 323 may be formed in a variety of manners. For example, the second segment 323 can be formed by a punching process. The first segment 322 may also be disposed in a variety of manners. For example, after the second segment 323 is formed by punching, the second segment 323 is continued to be turned on its peripheral side to form the first segment 322. In this way, the transition portion 326 is formed by turning, and a thickness of the transition portion 326 in the height direction is small.

The sealing plate 400 and the transition portion 326 may be connected with each other in a variety of manners. For example, the sealing plate 400 and the transition portion 326 are bonded to each other.

Alternatively, in order to further improve the sealing performance, the sealing plate 400 and the transition portion 326 are welded to each other. After the sealing plate 400 and the transition portion 326 are welded to each other, the sealing plate 400 is formed with a welding region at an edge, a reinforcing rib 340 is provided on an inner surface 330 of the first cover plate 300 facing the accommodating cavity 210, and an orthographic projection of the reinforcing rib 340 in the height direction covers an orthographic projection of the welding region in the height direction.

Since there is the welding region at the edge of the sealing plate 400, during the welding process of the sealing plate 400, the transition portion 326 may be heated to be deformed or even burnt through. In these optional embodiments of the present disclosure, the reinforcing rib 340 is disposed on a side of the transition portion 326 facing the accommodating cavity 210, and the orthographic projection of the reinforcing rib 340 in the height direction covers the orthographic projection of the welding region in the height direction, i.e., a size of the reinforcing rib 340 is larger than or equal to a size of the welding region; the strength of the transition portion 326 can be increased, and the transition portion 326 can be prevented from being deformed during the welding process.

The reinforcing rib 340 may be disposed in a variety of manners. For example, the reinforcing rib 340 is disposed to protrude out from the side of the transition portion 326 close to the accommodating cavity 210. By providing the reinforcing rib 340, the thickness where the transition portion 326 is located can be thickened, and the transition portion 326 can be prevented from being heated to be deformed or even burnt through. In other optional embodiments, the reinforcing rib 340 is made of high temperature resistant or high strength material, the structural strength and high temperature resistance performance of the transition portion 326 can be raised, thereby the transition portion 326 can be prevented from being heated to be deformed or even burnt through.

Figure 12:
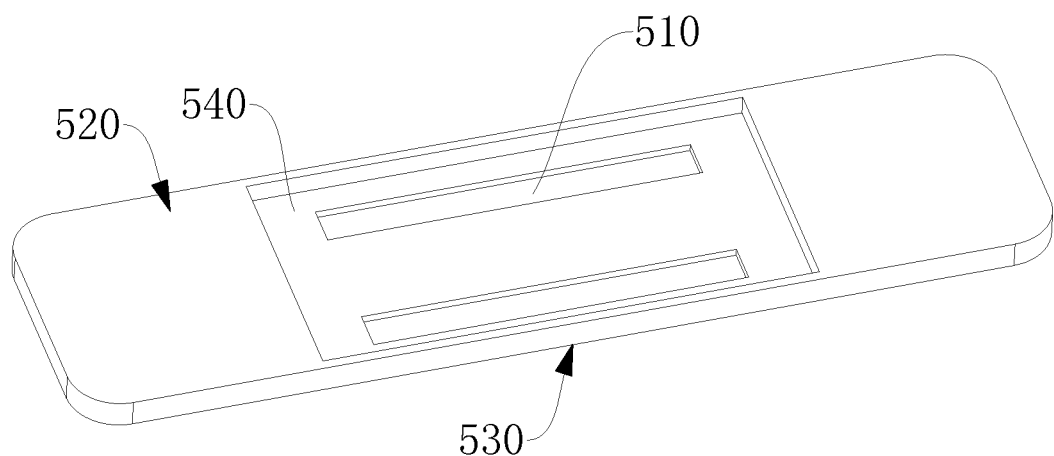
FIG. 12 is a schematic structural view of a separating plate of a secondary battery according to an embodiment of the present disclosure.

Please also refer to FIG. 12, in some optional embodiments, the secondary battery 10 further includes a separating plate 500, the separating plate 500 is located between the first cover plate 300 and the main body portion 110, the separating plate 500 is provided with a second relief hole 510 penetrating therethrough, and the first tab 120 passes through the first relief hole 310 and the second relief hole 510.

In these optional embodiments, by providing the separating plate 500, it can be ensured that the first cover plate 300 and the main body portion 110 are insulated from each other, thereby the safety performance of the secondary battery 10 can be improved. When the secondary battery 10 includes the separating plate 500, the first tab 120 passes through the first relief hole 310 and the second relief hole 510, i.e., the connecting portion 121 passes through the first relief hole 310 and the second relief hole 510.

The relative positional relationship between the first relief hole 310 and the second relief hole 510 is not limited here. In some optional embodiments, an orthographic projection of the second relief hole 510 at least partially overlap that of the first relief hole 310, in the height direction of the electrode unit 100. The connecting portion 121 extending in the height direction can simultaneously pass through the first relief hole 310 and the second relief hole 510, the extension distance of the connecting portion 121 can be reduced, thereby the size of the connecting portion 121 can be reduced.

Optionally, the first relief hole 310 and the second relief hole 510 are adapted to the connection portion 121 in terms of sizes, such that the first relief hole 310 and the second relief hole 510 can limit the position of the connection portion 121, and the stability of the relative position between the connecting portion 121 and the first cover plate 300 as well as the separating plate 500 can be ensured. In such a case, the orthographic projection of the first relief hole 310 overlap that of the second relief hole 510, in the height direction.

Further, optionally, in the thickness direction, a size of the second relief hole 510 is smaller than a size of the first relief hole 310. Since the size of the second relief hole 510 is small, the root of the first tab 120 can be restrained, thereby the probability of the first tab 120 being inserted into the main body portion 110 under vibration can be reduced.

The separating plate 500 may be disposed in a variety of manners. In some optional embodiments, the separating plate 500 includes a first surface 520 facing the first cover plate 300 and a second surface 530 facing the main body portion 110, and the first surface 520 is recessed toward the second surface 530 and forms a second recess 540, and at least part of the bottom plate 321 is disposed in the second recess 540.

In these optional embodiments, the first surface 520 is in contact with the inner surface of the first cover plate 300, and the second surface 530 is in contact with an end surface of the main body portion 110 close to the first cover plate 300, such that the separating plate 500 is fixed between the main body portion 110 and the first cover plate 300.

The separating plate 500 is formed with the second recess 540, and at least part of the bottom plate 321 is disposed within the second recess 540, not only the space occupied by the bottom plate 321 and the fixing portion 122 in the height direction can be reduced, but also a limiting can be provided by the second recess 540 to the bottom plate 321, the stability of the relative position between the bottom plate 321 and the second recess 540 can be ensured, thereby the stability of the relative positions of various components in the secondary battery 10 can be ensured, and the reliability of the secondary battery 10 can be improved.

Figure 13:
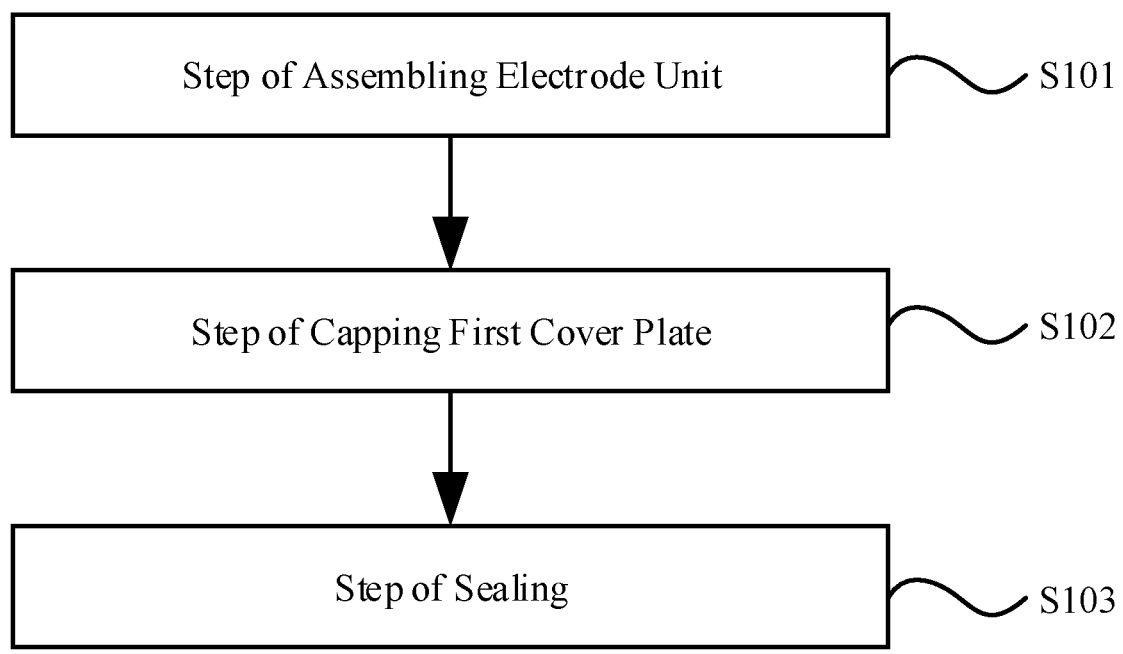
FIG. 13 is a schematic flowchart of a manufacturing method for a secondary battery according to an embodiment of the present disclosure.

Please also refer to FIG. 13. An embodiment of the present disclosure also provides a manufacturing method for the secondary battery, the secondary battery 10 is the secondary battery 10 in any of the above-mentioned embodiments. The method includes the following steps.

Step S101: a step of assembling the electrode unit.

Optionally, Step S101 includes: placing the electrode unit 100 within the accommodating cavity 210 of the casing 200, the electrode unit 100 including the main body portion 110 and the first tab 120 and the second tab 130 extending out from the main body portion 110, the casing 200 including the first opening 220 which is in communication with the accommodating cavity 210, and disposing the first tab 120 to face the first opening 220.

Step S102: a step of capping with the first cover plate.

Optionally, Step S102 includes: capping the first opening 220 with the first cover plate 300, the first cover plate 300 including the first relief hole 310 penetrating therethrough, and passing the first tab 120 through the first relief hole 310 and connecting the first tab 120 to the side of the first cover plate 300 facing away from the accommodating cavity 210.

Step S103: a step of sealing.

Optionally, Step S103 includes: sealingly connecting the sealing plate 400 to the side of the first cover plate 300 facing away from the accommodating cavity 210, and covering the first relief hole 310 with the sealing plate 400.

In the manufacturing method according to the embodiment of the present disclosure, in step S101, first placing the secondary battery 10 within the accommodating cavity 210, and in step S102, then passing the first tab 120 through the first relief hole 310 and connecting the first tab 120 with the outer surface of the first cover plate facing away from the accommodating cavity 210, and in step S103, finally sealing the first cover plate 300. In the embodiment of the present disclosure, after the first tab 120 passes through the first relief hole 310 and is bent, at least part of the first tab 120 is connected with the first cover plate 300 each other, therefore, other mechanical components (such as adaptor plates) can be omitted, thereby the production cost can be reduced. Furthermore, when the first tab 120 is welded to the side of the first cover plate 300 facing away from the accommodating cavity 210, the space occupied by the first tab 120 in the casing 200 can be reduced, thereby the energy density can be increased. Moreover, after the first tab 120 is welded with the first cover plate 300, there is no need to change the relative positional relationship between the first tab 120 and the main body portion 110, and the probability of the first tab 120 being inserted into the main body portion 110 can be reduced. Therefore, the manufacturing method for the secondary battery according to the embodiment of the present disclosure can not only reduce the space occupied by the first tab 120 in the casing 200, but also improve the safety performance of the secondary battery 10.

In other optional embodiments, before Step S102, the method further includes: punching the first cover plate 300 to form the first recess 320 including the bottom plate 321 on the surface of the first cover plate 300, and positioning the first relief hole 310 on a side of the bottom plate 321 in the thickness direction of the secondary battery 10.

In this case, Step S102 also includes: capping the first opening 220 with the first cover plate 300, positioning the first recess 320 on the side of the first cover plate 300 facing away from the accommodating cavity 210, and passing the first tab 120 including the connecting portion 121 and the fixing portion 122 through the first relief hole 310, passing the connecting portion 121 through the first relief hole 310, and bending the fixing portion 122 relative to the connecting portion 121, such that the fixing portion 122 is disposed within the first recess 320 and connected to the bottom plate 321.

In addition, when the secondary battery 10 includes the separating plate 500, before Step S102, the method further includes: disposing the separating plate 500 at the first opening 220 and disposing the first tab 120 to pass through the second relief hole 510. At this time, after Step S102, the method further includes: disposing at least part of the bottom plate 321 of the first cover plate 300 within the second recess 540 of the separating plate 500. Subsequently, capping the separating plate 500 with the first cover plate 300, and passing the first tab 120 through the second relief hole 510 and the first relief hole 310 in sequence.

In these optional embodiments, by providing the separating plate 500, it can be ensured that the first cover plate 300 and the main body portion 110 are insulated from each other, thereby the safety performance of the secondary battery 10 can be improved. By disposing the bottom plate 321 of the first recess 320 within the second recess 540, not only the space occupied by the bottom plate 321 and the first tab 120 in the height direction can be reduced, but also a limiting can be provided by the second recess 540 to the bottom plate 321, the stability of the relative position between the bottom plate 321 and the second recess 540 can be improved, thereby the stability of the relative positions of various components in the secondary battery 10 can be ensured and the reliability of the secondary battery 10 can be improved.

It should be understood by those skilled in the art that the above-mentioned embodiments are all exemplary rather than restrictive. Different technical features appearing in different embodiments can be combined to achieve beneficial effects. Those skilled in the art should be able to understand and implement other modified embodiments of the disclosed embodiments on the basis of studying the drawings, description, and claims. In the claims, the term "comprising" does not exclude other devices or steps; terms such as "a", "an" and "the" are not intended to refer to only a singular entity, but include a description of a plurality of entities, and can be used interchangeably with one or at least one; the terms "first" and "second" are intended to indicate names rather than to indicate any specific order. Any reference numerals in the claims should not be construed as limiting the scope of protection. The functions of multiple parts appearing in the claims can be achieved by a single hardware or software module. The appearance of certain technical features in different dependent claims does not mean that these technical features cannot be combined to achieve beneficial effects.

What is claimed is:

1. A secondary battery, comprising:
an electrode unit, comprising a main body portion, and a first tab and a second tab extending out from the main body portion;
a casing, comprising an accommodating cavity for accommodating the main body portion and a first opening which is in communication with the accommodating cavity;
a first cover plate capping the first opening, the first cover plate comprising a first relief hole penetrating therethrough, the first tab passing through the first relief hole and being welded to a side of the first cover plate facing away from the accommodating cavity; and
a sealing plate, which is sealingly connected to the side of the first cover plate facing away from the accommodating cavity and covers the first relief hole, wherein
an outer surface of the first cover plate facing away from the accommodating cavity is recessed toward the accommodating cavity and forms a first recess, the first recess comprises a bottom plate, and the first relief hole is located on a side of the bottom plate along a thickness direction of the secondary battery;
the first tab comprises a connecting portion and a fixing portion, the fixing portion is disposed within the first recess and connected to the bottom plate, and the connecting portion is disposed to be bent relative to the fixing portion and penetrates through the first relief hole; and
the first cover plate comprises an inner surface facing the accommodating cavity, and the bottom plate is disposed to protrude out from the inner surface in a direction facing the accommodating cavity.

2. The secondary battery according to claim 1, wherein,
a number of the first relief hole is two, and two first relief holes are located on two sides of the bottom plate along the thickness direction; and
a number of the electrode units is two, two electrode units are arranged side by side along the thickness direction, and the first tabs of the two electrode units respectively pass through the two first relief holes, and the fixing portions of the two first tabs extend in directions approaching each other.

3. The secondary battery according to claim 1, wherein,
the first recess comprises a first segment and a second segment which are successively arranged in a height direction of the secondary battery, and the first segment is located on a side of the second segment facing away from the accommodating cavity, and an orthographic projection of the second segment in the height direction is located within an orthographic projection of the first segment in the height direction; and
at least part of the fixing portion is accommodated in the second segment, and the sealing plate is accommodated in the first segment.

4. The secondary battery according to claim 3, wherein the first recess comprises a first side wall facing the first segment, a second side wall facing the second segment, and a transition portion, the first side wall and the second side wall are connected with each other by the transition portion, and the sealing plate is located on a side of the transition portion facing away from the accommodating cavity.

5. The secondary battery according to according to claim 3, wherein,
the sealing plate comprises a welding region at an edge, a reinforcing rib is provided at the inner surface of the first cover plate facing the accommodating cavity, and an orthographic projection of the reinforcing rib in the height direction of the electrode unit covers an orthographic projection of the welding region in the height direction.

6. The secondary battery according to claim 1, further comprising a separating plate located between the first cover plate and the main body portion, the separating plate is provided with a second relief hole penetrating therethrough, and the first tab passes through the first relief hole and the second relief hole.

7. The secondary battery according to claim 6, wherein, an orthographic projection of the second relief hole at least partially overlaps that of the first relief hole, in the height direction of the electrode unit.

8. The secondary battery according to claim 6, wherein, the separating plate comprises a first surface facing the first cover plate and a second surface facing the main body portion, the first surface is recessed toward the second surface and forms a second recess, and at least part of the bottom plate is disposed within the second recess.

9. The secondary battery according to claim 1, wherein, the secondary battery further comprises a first electrode terminal electrically connected with the first tab and a second electrode terminal electrically connected with the second tab, the first electrode terminal is electrically connected with the first cover plate and the casing, and the second electrode terminal is insulated from the first cover plate and the casing.

10. The secondary battery according to claim 9, wherein, the secondary battery further comprises a second cover plate, the casing comprises a second opening which is in communication with the accommodating cavity, and the second opening and the first opening are respectively located at two ends of the casing along the height direction of the secondary battery, the second cover plate caps the second opening, the first electrode terminal and the second electrode terminal are both disposed on the second cover plate, and the first tab is electrically connected with the first electrode terminal by the first cover plate, the casing, and the second cover plate in sequence, and the second tab is insulated from the second cover plate.

11. A manufacturing method for a secondary battery according to claim 1, comprising:
  a step of assembling an electrode unit: placing an electrode unit within an accommodating cavity of a casing, the electrode unit comprising a main body portion, and a first tab and a second tab extending out from the main body portion, the casing comprising a first opening which is in communication with the accommodating cavity, and disposing the first tab faces the first opening;
  a step of capping with a first cover plate: capping the first opening with the first cover plate, the first cover plate comprising a first relief hole penetrating therethrough, and passing the first tab through the first relief hole and welding the first tab to a side of the first cover plate facing away from the accommodating cavity; and
  a step of sealing: sealingly connecting a sealing plate to the side of the first cover plate facing away from the accommodating cavity, and covering the first relief hole with the sealing plate, wherein,
  before the step of covering the first cover plate, the manufacturing method further comprises:
  punching the first cover plate to form a first recess on a surface of the first cover plate, the first recess comprising a bottom plate, the bottom plate protruding out from an inner surface of the first cover plate facing the accommodating cavity in a direction facing the accommodating cavity, and positioning the first relief hole on a side of the bottom plate along the thickness direction of the secondary battery; and
  the step of capping with the first cover plate further comprises: capping the first opening with the first cover plate, positioning the first recess on the side of the first cover plate facing away from the accommodating cavity, passing the first tab through the first relief hole, the first tab comprising a connecting portion and a fixing portion, passing the connecting portion through the first relief hole, and bending the fixing portion relative to the connecting portion, such that the fixing portion is disposed in the first recess and connected to the bottom plate.

12. The manufacturing method of the secondary battery according to claim 11, wherein,
  before the step of capping with the first cover plate, the manufacturing method further comprises:
  capping the first opening with a separating plate, the separating plate being provided with a second relief hole penetrating therethrough, and passing the first tab through the second relief hole; and
  the step of capping with the first cover plate further comprises: subsequently capping the separating plate with the first cover plate, and passing the first tab through the second relief hole and the first relief hole in sequence.

* * * * *